THOMAS B. FAGAN.
Improvement in Sawing-Machines.
No. 127,326.           Patented May 28, 1872.
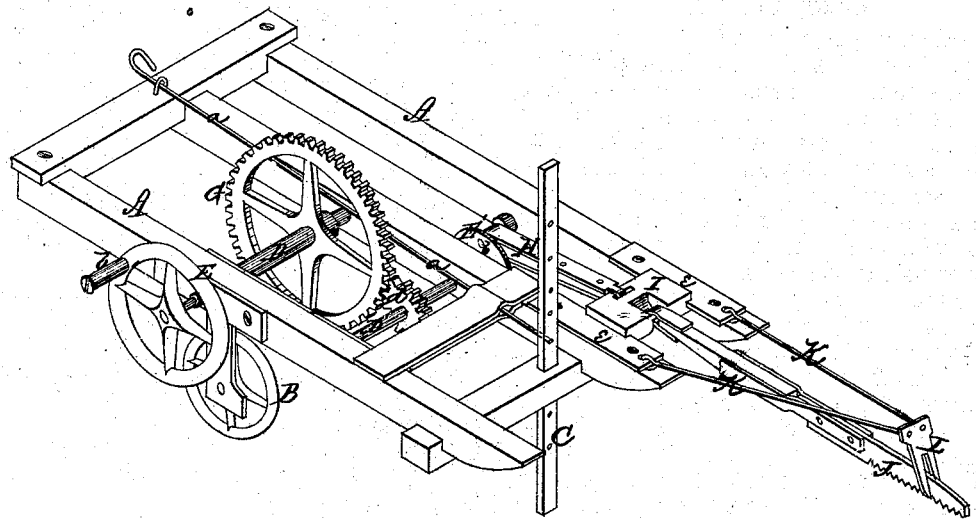

UNITED STATES PATENT OFFICE.

THOMAS B. FAGAN, OF MENDON, OHIO.

IMPROVEMENT IN SAWING-MACHINES.

Specification forming part of Letters Patent No. 127,326, dated May 28, 1872.

SPECIFICATION.

*To all whom it may concern:*

Be it known that I, T. B. FAGAN, of Mendon, in the county of Mercer and State of Ohio, have invented certain new and useful Improvements in Sawing-Machines; and I do hereby declare that the following is a full, clear, and exact description thereof, reference being had to the accompanying drawing and to the letters of reference marked thereon which form a part of this specification.

The nature of my invention consists in the construction and arrangement of a machine for sawing logs in the woods, as will be hereinafter more fully set forth.

In order to enable others skilled in the art to which my invention appertains to make and use the same, I will now proceed to describe its construction and operation, referring to the annexed drawing, in which is represented a perspective view of my saw.

A represents a frame of suitable dimensions supported upon two truck-wheels, B B, and at the front end by an upright sliding bar, C. This bar is perforated, as shown, and a rod, $a$, held on the frame by staples, may be passed through either of said holes to hold the machine up at any desired height to suit any-sized log, so that the saw may run level, and thereby have the full weight of the saw on the log. D is the main shaft, provided at its outer end with a balance-wheel, E, having a crank, $b$, by means of which it is turned. On this shaft is a large cog-wheel, G, gearing with a pinion, $d$, on the pitman-shaft D'. On this latter shaft is another balance-wheel, E', provided with a wrist-pin, $b'$, upon which the pitman H is placed, said pitman connecting with and moving the sliding cross-head I on the ways $e\ e$. J is the saw pivoted to the cross-head I. K K represent two bars or rods hinged or pivoted to the frame A, one on each side of the cross-head, and their front or outer ends attached to a forked or pronged hook, L, which is to be thrown down on the log straddling the saw, thus serving the double purpose of holding the log and guiding the saw.

The two balance-wheels E E', arranged as described, give double power on the saw and a very fast motion.

Having thus fully described my invention, what I claim as new, and desire to secure by Letters Patent, is—

The combination of the frame A, wheels B, sliding bar C, rod $a$, shafts D D', balance-wheels E E', cog-wheel G, pinion $d$, pitman I, saw J, and rods K with hook L, all constructed and arranged substantially as and for the purposes herein set forth.

In testimony that I claim the foregoing as my own I affix my signature in presence of two witnesses.

T. B. FAGAN.

Witnesses:
    J. H. PATTERSON,
    L. C. ANDERSON.